United States Patent
Hage et al.

(10) Patent No.: US 11,408,054 B2
(45) Date of Patent: Aug. 9, 2022

(54) METHOD FOR THE RECOVERY OF ZINC

(71) Applicant: TATA STEEL NEDERLAND TECHNOLOGY B.V., Velsen-Noord (NL)

(72) Inventors: Johannes Hage, Bilthoven (NL); Hendrikus Koenraad Albertus Meijer, Bergen (NL); Tim Peeters, Delft (NL)

(73) Assignee: TATA STEEL NEDERLAND TECHNOLOGY B.V., Bilthoven (NL)

( * ) Notice: Subject to any disclaimer, the term of this patent is extended or adjusted under 35 U.S.C. 154(b) by 0 days.

(21) Appl. No.: 17/042,261

(22) PCT Filed: Mar. 29, 2019

(86) PCT No.: PCT/EP2019/058000
§ 371 (c)(1),
(2) Date: Sep. 28, 2020

(87) PCT Pub. No.: WO2019/185863
PCT Pub. Date: Oct. 3, 2019

(65) Prior Publication Data
US 2021/0047709 A1    Feb. 18, 2021

(30) Foreign Application Priority Data
Mar. 30, 2018   (EP) .................................... 18165336

(51) Int. Cl.
*C22B 19/36*    (2006.01)
*C22B 19/08*    (2006.01)

(52) U.S. Cl.
CPC ............. *C22B 19/36* (2013.01); *C22B 19/08* (2013.01)

(58) Field of Classification Search
CPC ...... C22B 19/36; C22B 19/08; C21B 13/0026; C21B 11/08; C21B 13/008; C21B 13/0013; Y02P 10/122
(Continued)

(56) References Cited

U.S. PATENT DOCUMENTS

| | | | |
|---|---|---|---|
| 5,567,225 A | 10/1996 | Bernard et al. | |
| 6,042,776 A * | 3/2000 | Isozaki | C22B 7/02 266/148 |
| 6,440,195 B1 * | 8/2002 | Dry | F27D 17/003 75/502 |

FOREIGN PATENT DOCUMENTS

| | | |
|---|---|---|
| WO | 2015089563 A1 | 6/2015 |
| WO | 2015090623 A1 | 6/2015 |

OTHER PUBLICATIONS

International Search Report and Written Opinion dated May 15, 2019 for PCT/EP2019/058000 to Tata Steel Nederland Technology B.V. filed Mar. 29, 2019.

* cited by examiner

*Primary Examiner* — Brian D Walck
*Assistant Examiner* — Danielle Carda
(74) *Attorney, Agent, or Firm* — Vorys, Sater, Seymour and Pease LLP

(57) ABSTRACT

A method for the recovery of zinc from zinc containing materials using a smelting apparatus for smelting a metalliferous feed material, wherein the smelting apparatus includes a smelting vessel, a smelt cyclone mounted on the smelting vessel and in connection with the inside of the smelting vessel and an off-gas duct connected to the smelt cyclone, and wherein the method includes the steps of:
  injecting the feed material with a carrier gas into the smelt cyclone,
  injecting an oxygen containing gas into the smelt cyclone,
(Continued)

injecting coal with a carrier gas into the smelting vessel,
injecting an oxygen containing gas into the smelting vessel,
optionally injecting fluxes with a carrier gas into the smelting vessel,
wherein the zinc containing materials are injected into the smelt cyclone and/or into the smelting vessel.

24 Claims, 1 Drawing Sheet

(58) Field of Classification Search
USPC .......................................................... 75/655
See application file for complete search history.

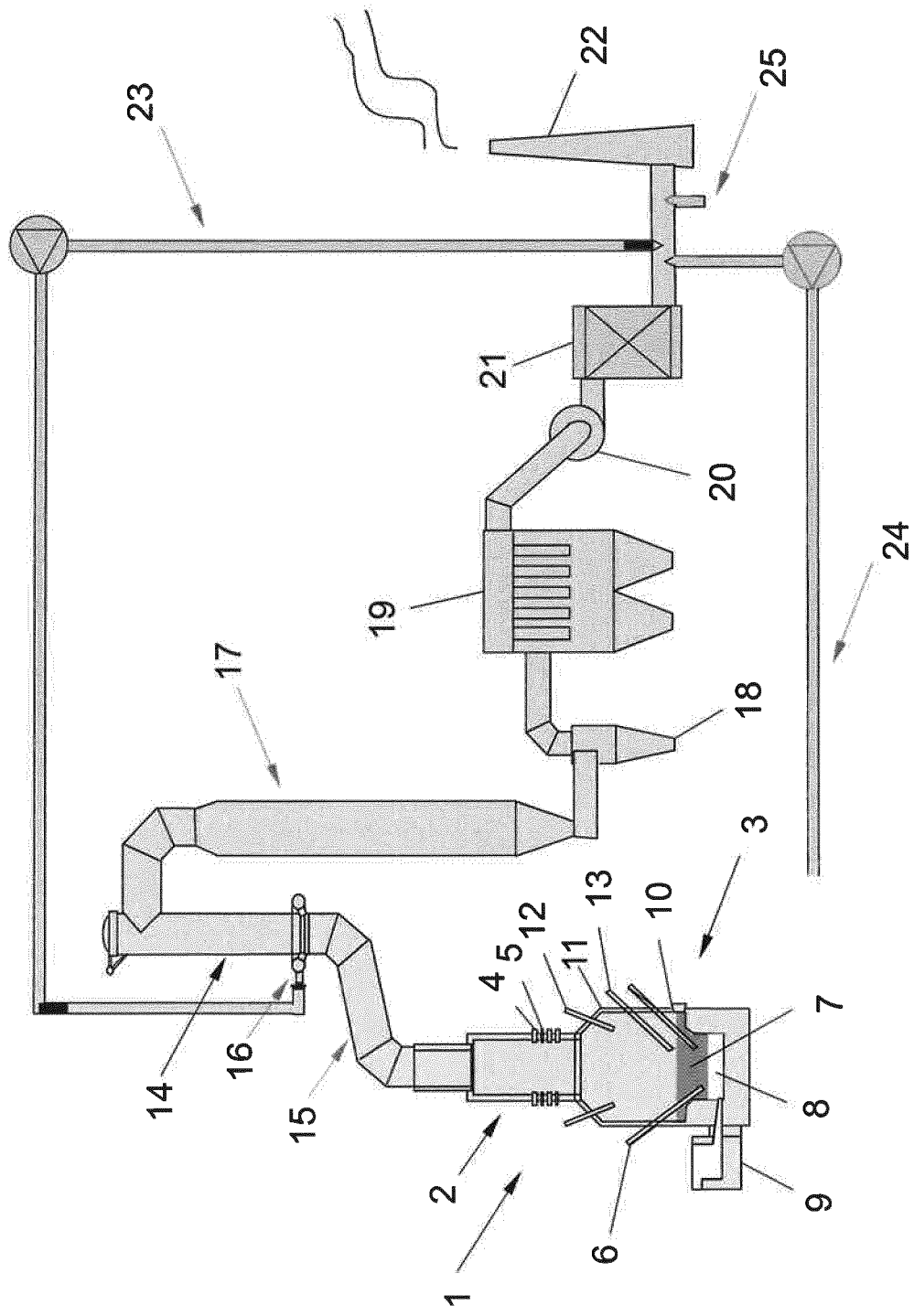

METHOD FOR THE RECOVERY OF ZINC

CROSS-REFERENCE TO RELATED APPLICATIONS

This is a § 371 National Stage Application of International Application No. PCT/EP2019/058000 filed on Mar. 29, 2019, claiming the priority of European Patent Application No. 18165336.1 filed on Mar. 30, 2018.

FIELD OF THE INVENTION

The invention relates to a method for the recovery of zinc from zinc containing materials using a smelting apparatus for smelting a metalliferous feed material and processing the feed material into liquid iron.

BACKGROUND OF THE INVENTION

In iron and steel production, iron ores, steel scrap and ferrous waste streams may contain heavy metals like zinc, lead, cadmium and silver in low concentrations. These elements and compounds with these elements, for instance oxides and sulphides, affect the blast furnace process. From the heavy metals zinc has the largest effect because the amount of zinc is by far the largest amount of all heavy metals present in the blast furnace charge. The temperature gradient in the blast furnace stack results in a zinc cycle in the blast furnace, with zinc reduction and evaporation in the lower part of the blast furnace stack with higher temperatures and oxidation and condensation on particles in the higher part of the blast furnace stack to be carried again to the lower part with the higher temperatures. Zinc has a large negative effect on the lining of the blast furnace and for that reason the input of zinc should be as limited as possible. Because of this the recycling of zinc-containing ferrous waste or steel scrap has to be limited as well as the use of zinc-rich ores.

The steel industry generates significant amounts of zinc-bearing waste which cannot be processed and end up in landfills. Likewise, the zinc industry produces iron-bearing wastes with zinc, which are landfilled as well. Ore mines also produce tailings, containing valuable metal components. Zinc represents an economic value when concentrated and separated from the iron and steel making processes. The conventional blast furnace—basic oxygen steelmaking route does not enable zinc separation.

The separation and/or concentration of zinc can be carried out by using rotary hearth furnaces (RHF). A RHF is designed to produce metallised pellets or briquettes from zinc bearing input materials. This process requires a preparation stage for making pellets or briquetting from the fine grained input materials such as iron ores and zinc bearing ferrous wastes. The pellets or briquettes are heated on a rotary bed to reduce the iron oxides and to evaporate the zinc. The zinc is then recovered from the off gas of the RHF. The pellets or briquettes produces with the RHF are then used for ironmaking and/or steelmaking processes. The use of a RHF to remove the zinc content previous to the ironmaking or steelmaking process means an extra processing step and consequently an increase of costs.

Another method for the separation and/or concentration of zinc is by using an electric arc furnace (EAF). An EAF is designed to melt metallic iron (direct reduced iron, hot briquetted iron) and scrap in order to produce liquid steel. Zinc present in the input materials will evaporate and end up in the dust in the EAF off-gas from which it can be separated captured through the dust in the off gas. The EAF process is however not suitable for handling ferrous oxides with zinc in large quantities. Ferrous wastes will need agglomeration and pelletizing and/or pre-reduction to make them usable in the EAF, which again means an extra processing step and consequently an increase of costs.

OBJECTIVES OF THE INVENTION

It is an objective of the present invention to provide a method for the recovery of zinc from zinc containing materials in an ironmaking process without the need of a preceding processing step of the zinc containing materials.

It is another objective of the present invention to provide a method for the recovery of zinc from zinc containing materials in an ironmaking process which allows for large inputs of zinc containing materials.

It is another objective of the present invention to provide a method for the recovery of zinc from zinc containing materials in an ironmaking process which can be carried out without any or at most limited extra costs.

It is another objective of the present invention to provide a method for the recovery of zinc from zinc containing materials in an ironmaking process resulting in an end product with a high zinc content.

It is another objective of the present invention to provide a method for the recovery of zinc from zinc containing materials in an ironmaking process resulting in an end product that can be used economically in a regular zinc smelting process.

DESCRIPTION OF THE INVENTION

One or more of the objectives of the invention are realized by providing a method for the recovery of zinc from zinc containing materials using a smelting apparatus for smelting a metalliferous feed material, wherein the smelting apparatus comprises a smelting vessel, a smelt cyclone mounted on the smelting vessel and in connection with the inside of the smelting vessel and an off-gas duct connected to the smelt cyclone, wherein the method comprises the steps of:
- injecting the feed material with a carrier gas into the smelt cyclone,
- injecting an oxygen containing gas into the smelt cyclone,
- injecting coal with a carrier gas into the smelting vessel,
- injecting an oxygen containing gas into the smelting vessel,
- optionally injecting fluxes with a carrier gas into the smelting vessel, wherein the zinc containing materials are injected into the smelt cyclone and/or into the smelting vessel.

With the method according to the invention the zinc containing materials can be injected without that any pre-processing step such as pelletizing or briquetting is necessary. The zinc containing materials can also be injected in considerable amounts without negatively influencing the smelting reduction process.

The zinc containing materials can be injected either into the smelt cyclone or at in the smelting vessel wherein the zinc containing materials injected into the smelting vessel are injected above and/or in a slag layer on the liquid feed material in the smelting vessel.

Typically the zinc containing materials injected into the smelting vessel are injected at a first and/or a second level wherein the first level is between the smelt cyclone and the slag layer on the liquid metal in the smelting vessel and wherein the injection at the second level is carried out through a supply lance into the slag layer or just above the slag layer.

The different injection levels of the zinc containing materials are selected based on the size of the materials. Typically the particle size of the zinc containing materials injected into the smelt vessel at the first level have a particle size of at most 15 cm, preferably at most 10 cm and more preferably at most 5 cm. These larger particles have an upper limit which is determined by vessel size and processing conditions which should be such that the larger particles or pieces do not end up in the liquid feed material below the slag layer. There should be sufficient time for the material to melt and the zinc in the material to melt and evaporate.

Smaller particles of zinc containing materials can be injected directly in the smelt cyclone together with the metalliferous feed material, such as iron ore(s). The smelt cyclone is capable of handling metalliferous feed material up to a certain size and for that reason the zinc containing material that is injected through the smelt cyclone is limited to that size range. Typically, the particle size of the zinc containing materials injected into the smelt cyclone are in a range of at most 2.0 mm, preferably at most 1.5 mm and more preferably at most 1.0 mm. Zinc containing material with larger particles or pieces should be injected into the smelting vessel at the first level. For particles injected in the smelt cyclone also a certain lower limit applies because very small particles could directly be carried out of the smelt cyclone with the off-gas without properly melting and evaporating. With only a small very fine fraction melting and evaporation will still happen but large amounts of very fine particles should not be injected into the smelt cyclone.

Large amounts of very fine particles wherein the particle size of the zinc containing materials injected at the second level into the slag layer have a particle size of at most 50 µm, preferably of at most 30 µm and more preferably 20 µm. For instance blast furnace dust is injected at this level into the slag layer using a supply lance. With that it is prevented that part of the material is carried out of the smelting apparatus with the off gas and ends up in a bag filter without being processed.

The process temperature in the smelting vessel is about 1500° C. and above under reducing conditions as a result of which the zinc present in the zinc containing materials will evaporate.

According to a further aspect of the invention it is provided that the off-gas is guided through an inclined off-gas duct part downstream of the smelting vessel and the smelt cyclone. The inclined off-gas duct part has an inclination in the range of 50-90°, typically 60-70° to the vertical which provides that any liquid iron that is entrained in droplets by the off-gas will end up against the wall of the inclined duct part and will flow back and end up in the smelting vessel. In this manner most of the iron droplets present in the off-gas can be recovered resulting in that more than 90% of the iron present in the off-gas can be recovered. In recent trials the results were even better and it was determined that even 99% of the iron present in the off-gas was recovered. As a result the ratio of zinc in the dust separated from the off-gas will increase. Instead of the inclined off-gas duct part other forms are possible as well such as a twisted duct part, a spiralled duct part, an undulating duct part and the like as long as the shape is such that the entrained iron droplets will end up against the wall of such duct part.

The temperature in the inclined off-gas duct part is in a range of about 1600-1900° C. due to which the zinc vaporised in the smelting vessel remains vaporised and passes the inclined off-gas duct part.

According to a further aspect of the invention it is provided that the off-gas is cooled/quenched to a temperature ≤1200° C., preferably to a temperature of ≤1050° C. and more preferably to a temperature of ≤900° C. The cooling/quenching of the off-gas is typically carried out directly after the off-gas has passed the inclined off-gas duct part in an upright part of the off-gas duct. By cooling the off-gas to the temperatures given above or below those temperatures the vaporised zinc will be converted in zinc oxide which at the given temperatures is a solid. From experiments it was found that the zinc vapour converts to solid zinc oxide at about 1000° C. Cooling of the off-gas is done by injection of air, cooled off-gas, cooled and recycled off-gas or CO2 into the off-gas. The cooled and recycled off-gas has been desulphurised such that the main constituent of the recycled off-gas is CO2. With the desulphurisation of the off-gas also hydrogen chloride (HCl), hydrogen fluoride (HF), mercury and other trace metals are removed.

Instead of using any of the above mentioned gases as a cooling medium it is also possible to use a liquid, such as water, in the cooling of the off-gas.

The off-gas is further cooled by passing the off-gas through a cooling tower after which the dust is separated from the off-gas by means of a cold dust cyclone following the cooling tower. Instead of using a cooling tower for the further cooling of the off-gas an energy recovery system with high pressure steam cycle can be used, wherein a steam driven electric generator uses the thermal energy of the off-gas to generate electricity. With this feature part of the energy put into the process can be recovered. Instead of passing the off-gas through a cold dust cyclone after passing the cooling tower or the steam driven electric generator it is alternatively provided that the off-gas is first passed through a high temperature dust cyclone. The advantage of passing the off-gas through a high temperature dust cyclone is that a better separation of dust from the off-gas is obtained than possible with a cold dust cyclone downstream of the cooling tower. The high temperature dust cyclone is designed to withstand temperatures up to about 900-1000° C. The choice between the use of a cold or hot dust cyclone is dependent on the amount of off-gas and consequently the amount of dust that has to be handled by the dust cyclone, wherein by large dust volumes the choice will be in favour of a cold dust cyclone.

The off-gas after passing the cooling tower or the steam driven electric generator and hot or cold cyclone passes a bag filter. After passing a desulphurisation unit the final cleaned off-gas leaves the stack. Roughly half of the amount of dust that can be separated from the off-gas is separated by means of the cyclone and the other half thereof ends up in the bag filter. The zinc oxide in the off gas has a particle size in the fine to ultra-fine range and accumulates in the bag filter. Dependent on the amount of zinc containing materials supplied to the smelting apparatus the final amount of zinc oxide in the bag filter can be considerable.

According to a further aspect it is provided that at least part of the zinc oxide containing dust recovered from the off-gas is injected into the smelting vessel. By again vaporising the zinc oxide in the dust and passing the zinc vapour through the inclined off-gas duct part and cooling/quenching the off-gas after passing the inclined off-gas duct part the amount finally collected in the bag filter can even further be increased. In this way the amount of zinc oxide recovered can be in a range of 30-50% of the total amount of dust in the bag filter.

The off-gas from the smelting apparatus is controlled by controlling the amount of oxygen injected into the smelt cyclone and/or into the smelting vessel. The control is such that the conditions in the smelt cyclone and/or into the smelting vessel are reductive which is the basis of the reduction/smelting process. The conditions in the off-gas duct do not have to be reductive. Typically it is provided that the off-gas from the smelting apparatus is controlled by controlling the amount of oxygen injected into the process such that the conditions in the off-gas are oxidising. With that it is prevented that inflammable gasses such as hydrogen and carbon monoxide enter the off-gas duct.

According to still a further aspect of the invention it is provided that a controlled amount of oxygen is injected into the off-gas upstream of the inclined off-gas duct part. This has the same purpose as explained above and it further helps in the conversion from zinc vapour in the inclined off-gas duct part to solid zinc oxide particles downstream of the inclined off-gas duct part.

BRIEF DESCRIPTION OF THE DRAWING

The invention will be further explained with the example shown in the drawing, in which schematically a smelting apparatus with off-gas handling devices is shown.

DETAILED DESCRIPTION OF THE DRAWING

In the drawing a smelting apparatus 1 is shown which has a smelt cyclone 2 and below the smelt cyclone a smelting vessel 3. The smelt cyclone is provided with injections lances 4 to feed a metalliferous feed material such as iron ore into the smelt cyclone together with flux as far as necessary by means of an conveying gas. For the heating and partial melting of the injected iron ore oxygen is injected into the smelt cyclone 2 by means of a set of oxygen lances 5.

The smelting vessel 3 is provided with oxygen lances as well (not shown) to inject oxygen above the slag level when the smelting apparatus is in operation to adjust heating and reduction requirements of the process. Further lances 6 are provided to inject coal and/or additives in the slag layer 7. The molten iron 8 produced in the smelting reduction process is continuously discharged from the vessel 3 through a forehearth 9. The slag 7 resulting from the process is discharged from smelting vessel 3 by sequential tapping through a slag tap hole 10.

The smelting apparatus 1 is further designed for the injection of zinc containing materials at different levels in the apparatus. A first level of injection is the smelt cyclone 2 where the zinc containing materials are injected at the level where the metalliferous feed material is injected and/or just below that level. Injections through separate lances is an option but because the size of the zinc containing material injected at this level is within the range of the metalliferous feed material it is preferably injected in the smelt cyclone 2 together with the metalliferous feed material.

A second level for the injection of zinc containing materials is higher up in the smelting vessel 3, in this example in a roof portion 11 of the smelting vessel 3 through injection devices 12. At this level larger pieces of zinc containing materials are injected into the vessel. In this respect the term "inject" could mean a number of different methods to bring the zinc containing material into the vessel, for instance by means of a conveying gas or by means of a mechanical conveying system. Such systems are typically provided with a gas lock system to prevent that process gas escapes the vessel through the injection system or device.

A further injection level is just above the slag layer 7 or directly in slag layer 7 through injection lances 13. Injection of zinc containing materials at this level is for the finest fraction.

These different levels of injection of the zinc containing materials is to ensure that the zinc will melt and evaporate before the zinc containing materials reaches the liquid iron bath in the smelting vessel.

The zinc vapour will flow upward into the off-gas duct 14. The off-gas duct is provided with an inclined off-gas duct part 15 in which liquid iron or metalliferous droplets present in the off-gas will end up against the inner wall of the inclined off-gas duct part 15 and flow back into the smelting vessel 3. In this manner the off-gas will practically free from any iron components. This is important because the formation of Franklinite a zinc iron oxide is suppressed totally or to a very large extent. With Franklinite present in the zinc bearing dust makes the recovery of zinc from the dust more difficult and costly.

The temperature in the inclined off-gas duct part 15 is in a range of 1600-1900° C. at which temperature the zinc vaporised in the vessel under reductive conditions will remain vaporised. In the temperature range of 1600-1900° C. it is irrespective of whether the conditions are reductive or oxidising, the zinc will remain vaporised.

The inclined off-gas duct part 15 is followed by a cooling/quenching device 16 in the off-gas duct 14 with which the temperature of the off-gas is lowered to a temperature of 1200° C. or lower. At about 1000° C. the zinc vapour is changed to zinc oxide which is a solid with a fine to ultrafine particle size.

The off-gas with the dust and the zinc oxide is further cooled by means of heat exchange with a steam driven electric generator device 17 further downstream of the cooling/quenching device 16. After passing the steam driven electric generator 17 the off-gas goes through a cold cyclone dust separator 18 wherein the off-gas is at least partially cleaned. Instead of a cold dust cyclone 18 also a high temperature dust cyclone could be used which should be positioned upstream of steam driven electric generator 17 and downstream of the cooling/quenching device 16, for instance at the horizontal duct portion at the top of duct 14.

After passing through hot or cold dust cyclone and steam driven electric generator the off-gas goes through the bag filter 19 wherein most if not almost all dust and zinc oxide is removed from the off-gas.

Downstream of the bag filter or bag house 19 a desulphurisation unit 21 is provided for the removal of SOx compounds. Part of the cleaned off-gas after the desulphurisation unit 21 is used as cooling gas for the cooling/quenching device 16 for which a return duct 23 with compressor is provided. Another part of the cleaned off-gas after the desulphurisation unit 21 is used as carrier gas for injecting iron ore through lances 4 into cyclone 2 and/or injecting coal and/or additives through lances 6 into the slag layer 7, for which a return duct 24 with compressor is provided.

In order to pass the off-gas through the off-gas duct 14, cooling/quenching device 16, steam driven electric generator 17, cold dust cyclone 18, and bag filter 19 a fan 20 is provided in the off-gas duct 14 downstream of the bag filter 20. The fan 20 is not necessary if the smelting vessel 3 is operated at sufficient pressure.

Before the off-gas is discharged through stack 22 the NOx in the off-gas is removed as far as possible at location 25.

The invention claimed is:

1. A method for the recovery of zinc from zinc containing materials using a smelting apparatus for smelting a metalliferous feed material, wherein the smelting apparatus comprises a smelting vessel, a smelt cyclone mounted on the smelting vessel and in connection with the inside of the smelting vessel and an off-gas duct connected to the smelt cyclone, wherein the method comprises the steps of:
   injecting the metalliferous feed material with a carrier gas into the smelt cyclone,
   injecting an oxygen containing gas into the smelt cyclone,
   injecting coal with a carrier gas into the smelting vessel,
   injecting an oxygen containing gas into the smelting vessel,
   optionally injecting fluxes with a carrier gas into the smelting vessel, wherein the zinc containing materials are injected into the smelt cyclone and/or into the smelting vessel, wherein the off-gas is passed through a high temperature dust cyclone.

2. The method according to claim 1, wherein the zinc containing materials injected into the smelting vessel are injected above and/or in a slag layer on the liquid feed material in the smelting vessel.

3. The method according to claim 2, wherein the zinc containing materials injected into the smelting vessel are injected at a first and/or a second level wherein the first level is between the smelt cyclone and the slag layer on the liquid metal in the smelting vessel and wherein the injection at the second level is carried out through a supply lance into the slag layer.

4. The method according to claim 3, wherein the particle size of the zinc containing materials injected into the smelt vessel at the first level have a particle size of at most 15 cm.

5. The method according to claim 3, wherein the particle size of the zinc containing materials injected at the second level into the slag layer have a particle size of at most 50 µm.

6. The method according to claim 3, wherein the particle size of the zinc containing materials injected into the smelt vessel at the first level have a particle size of at most 10 cm.

7. The method according to claim 3, wherein the particle size of the zinc containing materials injected into the smelt vessel at the first level have a particle size of at most 5 cm.

8. The method according to claim 3, wherein the particle size of the zinc containing materials injected at the second level into the slag layer have a particle size of at most 30 µm.

9. The method according to claim 3, wherein the particle size of the zinc containing materials injected at the second level into the slag layer have a particle size of at most 20 µm.

10. The method according to claim 1, wherein the particle size of the zinc containing materials injected into the smelt cyclone are in a range of at most 2.0 mm.

11. The method according to claim 1, wherein the zinc containing materials are injected into the smelting vessel and the smelt cyclone.

12. The method according to claim 1, wherein the off-gas is guided through an inclined off gas duct part downstream of the smelting vessel and the smelt cyclone, and wherein the off-gas is cooled/quenched in an upright off-gas duct part downstream of the inclined off-gas duct part.

13. The method according to claim 12, wherein the off-gas is cooled/quenched to a temperature of ≤1200° C.

14. The method according to claim 12, wherein the off-gas is cooled/quenched to a temperature of ≤1050° C.

15. The method according to claim 12, wherein the off-gas is cooled/quenched to a temperature of ≤900° C.

16. The method according to claim 1, wherein at least part of the zinc oxide contained in a dust recovered from the off-gas is injected into the smelting vessel.

17. The method according to claim 1, wherein the off-gas from the smelting apparatus is controlled by controlling the amount of oxygen injected into the smelt cyclone and/or into the smelting vessel.

18. The method according to claim 1, wherein the off-gas from the smelting apparatus is controlled by controlling the amount of oxygen injected into the process such that the conditions in the off-gas are oxidizing.

19. The method according to claim 1, wherein the off-gas is guided through an inclined off gas duct part downstream of the smelting vessel and the smelt cyclone, and wherein a controlled amount of oxygen is injected into the off-gas upstream of the inclined off-gas duct part.

20. The method according to claim 1, wherein the particle size of the zinc containing materials injected into the smelt cyclone are in a range of at most 1.5 mm.

21. The method according to claim 1, wherein the particle size of the zinc containing materials injected into the smelt cyclone are in a range of at most 1.0 mm.

22. A method for the recovery of zinc from zinc containing materials using a smelting apparatus for smelting a metalliferous feed material, wherein the smelting apparatus comprises a smelting vessel, a smelt cyclone mounted on the smelting vessel and in connection with the inside of the smelting vessel and an off-gas duct connected to the smelt cyclone, wherein the method comprises the steps of:
   injecting the metalliferous feed material with a carrier gas into the smelt cyclone,
   injecting an oxygen containing gas into the smelt cyclone,
   injecting coal with a carrier gas into the smelting vessel,
   injecting an oxygen containing gas into the smelting vessel,
   optionally injecting fluxes with a carrier gas into the smelting vessel, wherein the zinc containing materials are injected into the smelt cyclone and/or into the smelting vessel, wherein the off-gas is passed through a cooling tower followed by a cold dust cyclone.

23. The method according to claim 10, wherein the zinc containing materials injected into the smelting vessel are injected above and/or in a slag layer on the liquid feed material in the smelting vessel.

24. A method for the recovery of zinc from zinc containing materials using a smelting apparatus for smelting a metalliferous feed material, wherein the smelting apparatus comprises a smelting vessel, a smelt cyclone mounted on the smelting vessel and in connection with the inside of the smelting vessel and an off-gas duct connected to the smelt cyclone, wherein the method comprises the steps of:
   injecting the metalliferous feed material with a carrier gas into the smelt cyclone,
   injecting an oxygen containing gas into the smelt cyclone,
   injecting coal with a carrier gas into the smelting vessel,
   injecting an oxygen containing gas into the smelting vessel,
   optionally injecting fluxes with a carrier gas into the smelting vessel, wherein the zinc containing materials are injected into the smelt cyclone and/or into the smelting vessel, wherein the off-gas is guided through an inclined off-gas duct part downstream of the smelting vessel and the smelt cyclone, wherein the off-gas is used to drive a steam driven electric generator.

* * * * *